United States Patent
Miyazaki et al.

(10) Patent No.: US 11,397,364 B2
(45) Date of Patent: Jul. 26, 2022

(54) OPTICAL MODULATOR AND OPTICAL TRANSMISSION APPARATUS

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 0 days.

(21) Appl. No.: 16/975,750

(22) PCT Filed: Jan. 23, 2019

(86) PCT No.: PCT/JP2019/002117
§ 371 (c)(1),
(2) Date: Aug. 26, 2020

(87) PCT Pub. No.: WO2019/167486
PCT Pub. Date: Sep. 6, 2019

(65) Prior Publication Data
US 2020/0409230 A1 Dec. 31, 2020

(30) Foreign Application Priority Data

Feb. 28, 2018 (JP) .............................. JP2018-034768

(51) Int. Cl.
*G02F 1/225* (2006.01)
*G02F 1/21* (2006.01)
*G02F 1/035* (2006.01)

(52) U.S. Cl.
CPC ............ *G02F 1/2255* (2013.01); *G02F 1/035* (2013.01); *G02F 1/212* (2021.01); *G02F 2202/20* (2013.01)

(58) Field of Classification Search
CPC .......... G02F 1/011; G02F 1/025; G02F 1/065; G02F 1/2255; G02F 1/2257; G02F 1/035;
(Continued)

(56) References Cited

U.S. PATENT DOCUMENTS

| 6,264,481 B1 * | 7/2001 | Kozel | G02B 6/3897 |
| | | | 385/88 |
| 7,266,305 B2 * | 9/2007 | Ohe | G02B 6/4214 |
| | | | 398/138 |

(Continued)

FOREIGN PATENT DOCUMENTS

| JP | 2003-258363 A | 9/2003 |
| JP | 2017-134131 A | 8/2017 |
| WO | 2011/132283 A1 | 10/2011 |

OTHER PUBLICATIONS

Infineon Technologies, Application notes V23832-T2131-M101 and V23832-R121-M101 (Year: 2003).*

(Continued)

*Primary Examiner* — Robert Tavlykaev
(74) *Attorney, Agent, or Firm* — Rankin, Hill & Clark LLP

(57) ABSTRACT

In an optical modulator, high frequency characteristics are improved and the stability thereof is improved. An optical modulator includes: an optical element substrate that includes an optical waveguide and a plurality of electrodes that control light waves propagating through the optical waveguide; and a package case that houses the optical element substrate, in which a plurality of signal input terminals, respectively electrically connected to the plurality of electrodes, are provided on the bottom surface of the package case, and the plurality of signal input terminals respectively electrically connected to the plurality of electrodes provided on the optical element substrate are divided (Continued)

and disposed on the sides facing each other with the optical element substrate interposed therebetween.

8 Claims, 6 Drawing Sheets

(58) Field of Classification Search
CPC .............. G02F 1/212; G02F 2201/127; G02F 2202/20; G02B 2006/12142
USPC .................................................. 385/1–3, 92
See application file for complete search history.

(56) References Cited

U.S. PATENT DOCUMENTS

2005/0281528 A1* 12/2005 Watanabe ............ G02B 6/4201
385/135
2017/0212402 A1* 7/2017 Ishii ..................... H01R 9/0515

OTHER PUBLICATIONS

International Search Report, International Application No. PCT/JP2019/002117, dated Apr. 16, 2019, 4 pages.

* cited by examiner

OPTICAL MODULATOR AND OPTICAL TRANSMISSION APPARATUS

TECHNICAL FIELD

The present invention relates to an optical modulator and an optical transmission apparatus using the optical modulator.

BACKGROUND ART

In recent years, a digital coherent transmission technique, which has been started to be applied to long-distance optical communication, is also being applied to metro optical communication such as medium-distance and short-distance due to a further increase in communication demand. In such digital coherent transmission, a DP-QPSK (Dual Polarization-Quadrature Phase Shift Keying) modulator using a LiNbO3 (hereinafter referred to as LN) substrate is typically used as an optical modulator. Hereinafter, an optical modulator using the LiNbO3 substrate will be referred to as an LN modulator.

Such an optical modulator has a plurality of radio frequency electrodes for a modulation operation on an optical element substrate housed in the interior thereof, and a package case of the optical modulator is provided with a plurality of signal input terminals for inputting a radio frequency signal from an external drive circuit (for example, a driver integrated circuit) to the radio frequency electrodes, respectively.

Such a plurality of signal input terminals are generally provided to be arranged in a line at a bottom portion of the package case, as shown in Patent Literature No. 1, such that the respective signal propagation paths from the signal input terminals to the radio frequency electrodes on the optical modulation element have the same electrical length (that is, so as to reduce a skew). However, with the progress of a circuit technique, it has become possible to perform skew adjustment within an integrated circuit. Therefore, in a case where a modulation signal frequency further increases according to a further increase in transmission capacity, it is more important to reduce a high frequency loss by shortening the electrical length itself of the signal propagation path, rather than a reduction of the skew. In this regard, the related art described above still has room for improvement from the viewpoint of improving high frequency characteristics and improving the stability thereof.

CITATION LIST

Patent Literature

[Patent Literature No. 1] Japanese Laid-open Patent Publication No. 2017-134131

SUMMARY OF INVENTION

Technical Problem

From the above background, in the optical modulator, it is desired to improve the high frequency characteristics and improve the stability thereof.

Solution to Problem

According to an aspect of the present invention, there is provided an optical modulator including: an optical element substrate which includes an optical waveguide and a plurality of electrodes that control light waves propagating through the optical waveguide; and a package case that fixes and houses the optical element substrate, in which a plurality of signal input terminals respectively electrically connected to the plurality of electrodes are provided on one surface of an outside of the package case, and in a case of being viewed in a plan view from a direction perpendicular to the one surface of the outside of the package case, the plurality of signal input terminals are divided and disposed on respective sides facing each other with the optical element substrate interposed therebetween.

According to another aspect of the present invention, the package case has a plurality of protrusion portions on the one surface, and at least one of the protrusion portions is provided with a fixing portion for mounting the package case to an external structure.

According to another aspect of the present invention, the signal input terminals constitute two terminal groups facing each other with the optical element substrate interposed therebetween, and the plurality of signal input terminals are disposed at two protrusion portions different for each of the two terminal groups.

According to another aspect of the present invention, the plurality of signal input terminals are disposed at one protrusion portion.

According to another aspect of the present invention, the fixing portion is disposed at the protrusion portion on which the signal input terminals are disposed.

According to another aspect of the present invention, the plurality of protrusion portions are disposed at positions substantially symmetrical with respect to a center line in a length direction and/or a width direction of the package case on the one surface of the package case.

According to another aspect of the present invention, the plurality of signal input terminals are disposed at positions substantially symmetrical with respect to a center line in a length direction and/or a width direction of the package case on the one surface of the package case.

According to another aspect of the present invention, there is provided an optical transmission apparatus including: the optical modulator according to anyone of the above aspects; and the circuit board that outputs an electric signal for causing the optical modulator to perform a modulation operation.

This specification includes all the contents of Japanese Patent Application No. 2018-034768 filed on Feb. 28, 2018.

DESCRIPTION OF EMBODIMENTS

Hereinafter, an embodiment of the present invention will be described with reference to the drawings.

Figure 1:
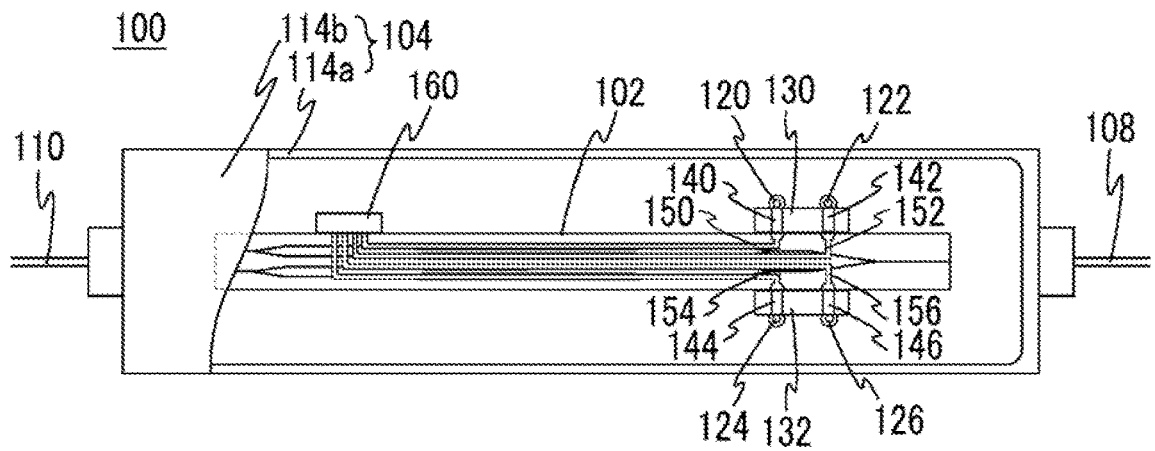
FIG. 1 is a plan view of an optical modulator according to an embodiment of the present invention.
Figure 2:
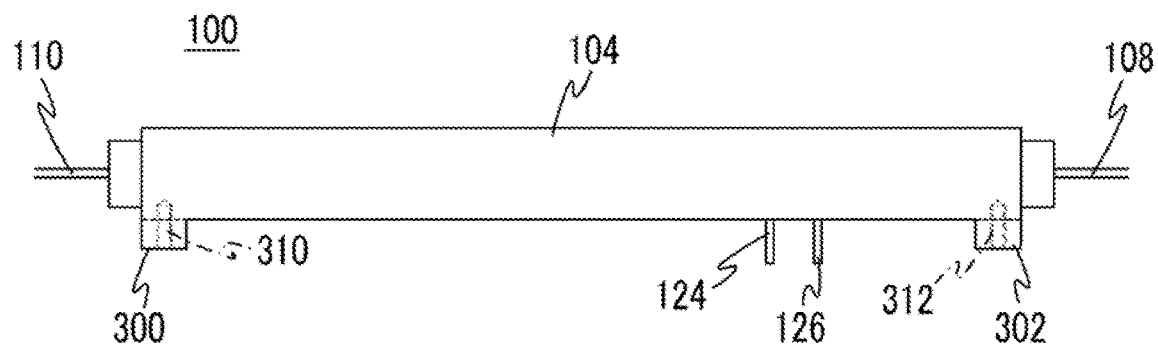
FIG. 2 is a side view of the optical modulator according to an embodiment of the present invention.
Figure 3:
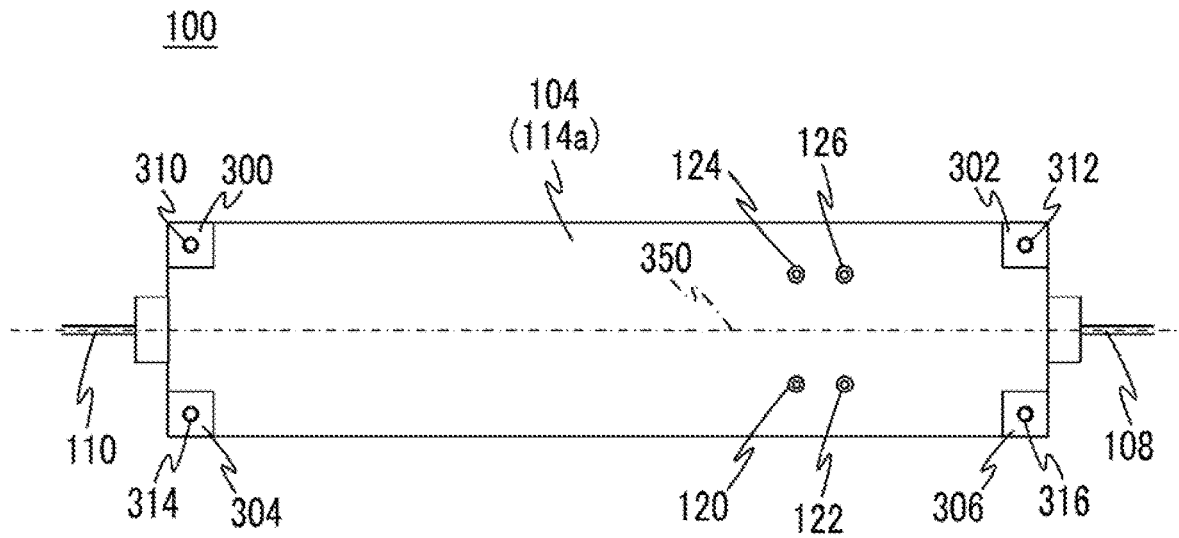
FIG. 3 is a bottom view of the optical modulator according to an embodiment of the present invention.

FIG. 1 is a plan view showing the configuration of an optical modulator 100 according to an embodiment of the present invention, FIG. 2 is a side view of the optical modulator 100, and FIG. 3 is a bottom view of the optical modulator 100. The optical modulator 100 is mounted on, for example, an external circuit board (for example, a circuit board 404 shown in FIG. 4 described later) on which an electric circuit for causing the optical modulator 100 to perform modulation is configured, and is electrically connected to the electric circuit to be used.

The optical modulator 100 includes an optical element substrate 102, a modulator package case 104 that houses the optical element substrate 102, an optical fiber 108 for inputting light to the optical element substrate 102, and an optical fiber 110 that leads the light that is output from the optical element substrate 102 to the outside of the modulator package case 104.

The optical element substrate 102 is a DP-QPSK optical modulator which includes four Mach-Zehnder type optical waveguides provided on an LN substrate, for example, and four RF electrodes (radio frequency electrodes) 150, 152, 154, and 156 which are respectively provided on the Mach-Zehnder type optical waveguides to modulate light waves propagating in the optical waveguides. The two lights that are output from the optical element substrate 102 are polarization-combined by, for example, a lens optical system (not shown) and led to the outside of the modulator package case 104 through the optical fiber 110.

The modulator package case 104 is composed of a case 114a to which the optical element substrate 102 is fixed, and a cover 114b. In order to facilitate understanding of the configuration inside the modulator package case 104, in FIG. 1, only a part of the cover 114b is shown on the left side of the drawing. However, in fact, the cover 114b is disposed so as to cover the entirety of the box-shaped case 114a and hermetically seals the inside of the modulator package case 104.

The case 114a is provided with four lead pins 120, 122, 124, and 126 which are signal input terminals for inputting radio frequency signals. The lead pins 120, 122, 124, and 126 extend outward from the bottom surface (the surface shown in FIG. 3) of the modulator package case 104. Here, the bottom surface of the modulator package case 104 corresponds to one surface of the outside of the modulator package case 104.

Further, the case 114a is made of a conductive material (for example, metal such as stainless steel, or a material coated with a thin metal film such as gold), and for example, when the optical modulator 100 is mounted on an external structure such as a circuit board, the case 114a and the external structure come into contact with each other, whereby the case 114a is connected to a ground line.

In the present embodiment, the four lead pins 120, 122, 124, and 126, which are signal input terminals, are disposed on the sides facing each other with the optical element substrate 102 interposed therebetween, in a case of being viewed in a plan view from the direction perpendicular to one surface of the outside of the modulator package case 104 (that is, the bottom surface of the modulator package case 104). That is, the four lead pins 120, 122, 124, and 126 are divided into two terminal groups respectively composed of the lead pins 120 and 122 and the lead pins 124 and 126, and the lead pins 120 and 122 constituting one terminal group are disposed on the side of the lower side of the optical element substrate 102 in the drawing, and are respectively electrically connected to one ends of the RF electrodes 150 and 152 through conductor patterns 140 and 142 on a relay board 130. Further, the lead pins 124 and 126 constituting the other terminal group are disposed on the side of the upper side of the optical element substrate 102 in the drawing, and are respectively electrically connected to one ends of the RF electrodes 154 and 156 of the optical element substrate 102 through conductor patterns 144 and 146 on a relay board 132. Each of the lead pins 120 and 122 and each of the conductor patterns 140 and 142 are electrically connected to each other by, for example, solder (not shown), and each of the lead pins 124 and 126 and each of the conductor patterns 144 and 146 are electrically connected to each other by, for example, solder (not shown). Further, each of the conductor patterns 140 and 142 and each of the RF electrodes 150 and 152 are electrically connected to each other by, for example, a gold (Au) wire, and each of the conductor patterns 144 and 146 and each of the RF electrodes 154 and 156 are electrically connected to each other by, for example, a gold (Au) wire.

Each of the RF electrodes 150, 152, 154, and 156 is designed such that the characteristic impedance thereof has a predetermined value in an operating frequency range, and each of the other ends of the RF electrodes 150, 152, 154, and 156 has impedance of the same value as the characteristic impedance and is terminated by a terminator 160.

Protrusion portions 300, 302, 304, and 306 having the same height from the bottom surface of the modulator package case 104 are provided at four corners of the bottom surface of the modulator package case 104, that is, the bottom surface (the surface shown in FIG. 3) of the case 114a. The top portion of each of the protrusion portions 300, 302, 304, and 306 is flat, and screw holes 310, 312, 314, and 316 for fixing the modulator package case 104 to the external structure are respectively provided in the top portions. The screw holes do not need to be necessarily provided in all of the protrusion portions 300, 302, 304, and 306, and may be provided in at least one protrusion portion. Further, from the viewpoint of reducing the occurrence of strain at the time of the processing of the modulator package case 104, it is desirable that the protrusion portions 300, 302, 304, and 306 are disposed at positions substantially symmetrical with respect to a center line in a length direction and/or a width direction of the modulator package case on the bottom surface of the modulator package case 104, as shown in FIG. 3.

Figure 4:
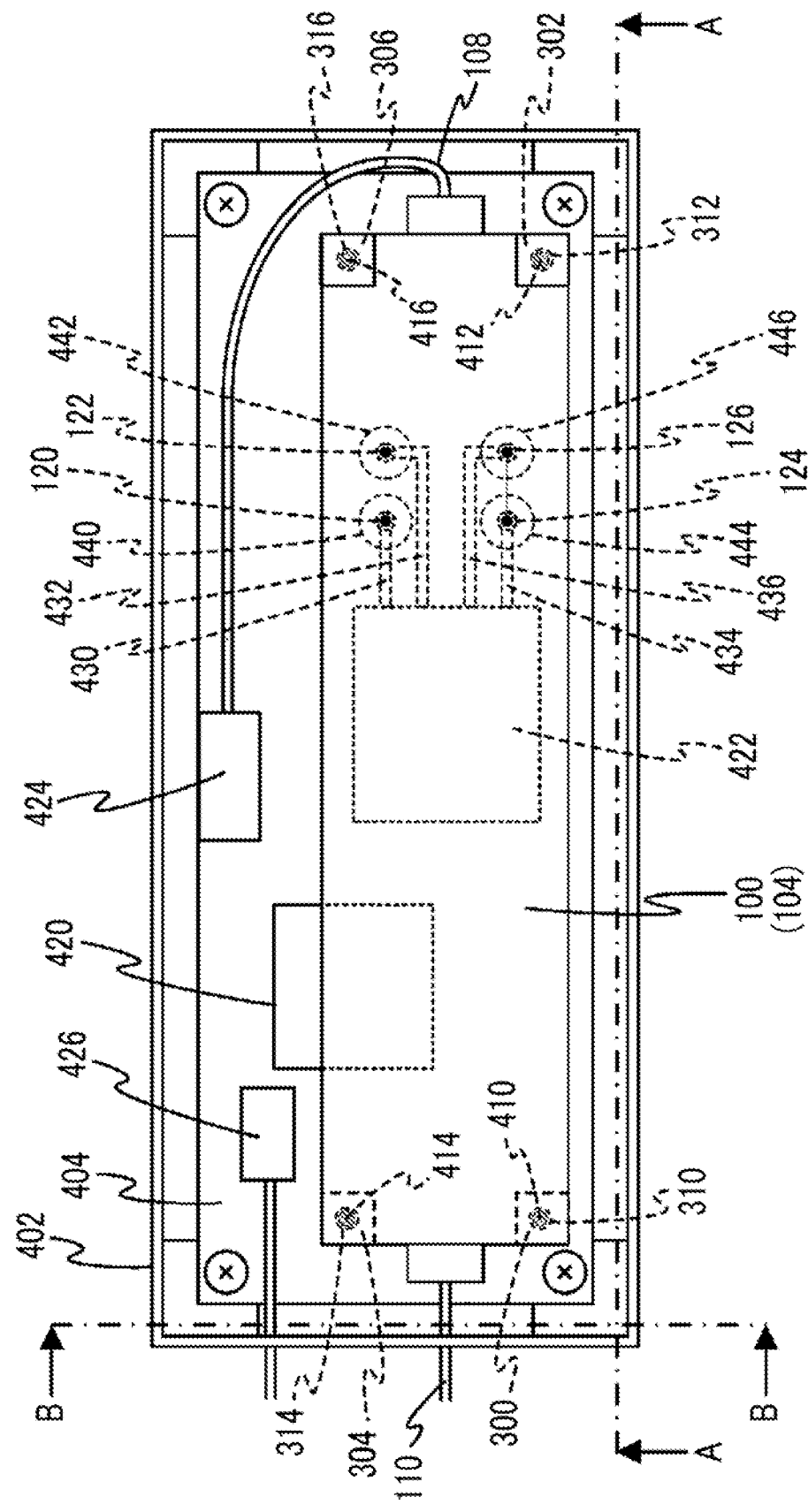
FIG. 4 is a plan view of an optical transmission apparatus in which the optical modulator shown in FIG. 1 is mounted.
Figure 5:
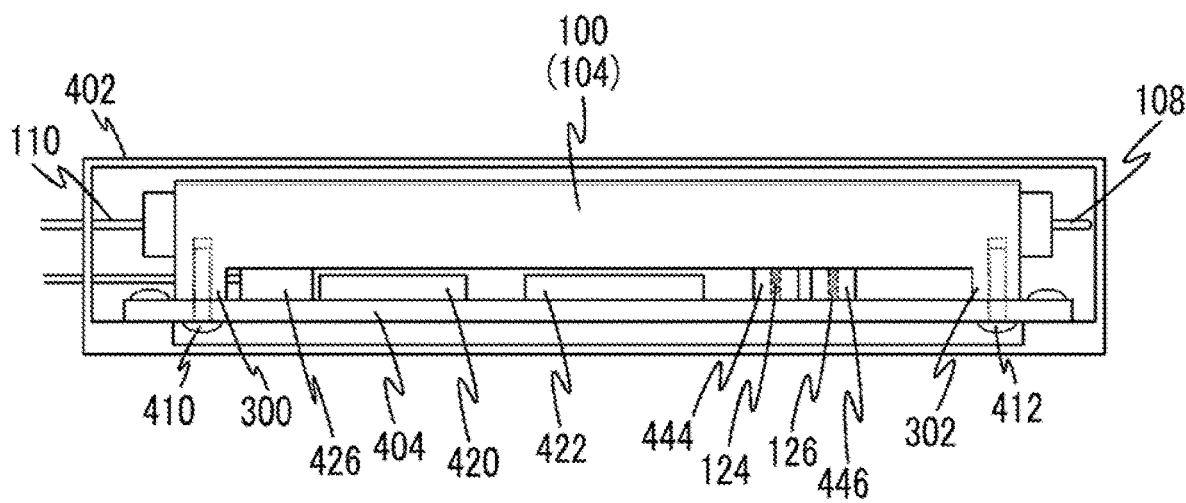
FIG. 5 is a sectional view taken along line A-A and viewed in the direction of an arrow of the optical transmission apparatus shown in FIG. 4.
Figure 6:
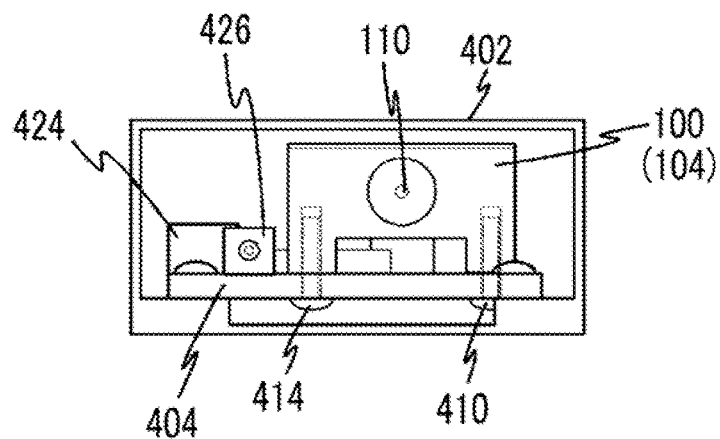
FIG. 6 is a sectional view taken along line B-B and viewed in the direction of an arrow of the optical transmission apparatus shown in FIG. 4.

FIG. 4 is a plan view of an optical transmission apparatus 400 in which the optical modulator 100 is mounted. Further, FIGS. 5 and 6 respectively are a sectional view taken along line A-A and viewed in the direction of an arrow and a sectional view taken along line B-B and viewed in the direction of an arrow of the optical transmission apparatus shown in FIG. 4.

The optical transmission apparatus 400 includes a circuit board 404 fixed inside a device package case 402. The optical modulator 100 is fixed and mounted on the circuit board 404 by fastening screws 410, 412, 414, and 416 to the screw holes 310, 312, 314, and 316 of the modulator package case 104. In this way, an electronic component mounting space corresponding to the height of each of the protrusion portions 300, 302, 304, and 306 provided on the modulator package case 104 is secured between the bottom surface of the modulator package case 104 and the circuit board 404.

Since the optical modulator 100 and the circuit board 404 are housed in the device package case 402, the optical modulator 100 and the circuit board 404 cannot be visually recognized from the outside of the device package case 402. However, in FIG. 4, for description, portions housed in the device package case 402 are also shown by using solid lines, except for the portion of the circuit board 404 hidden by the modulator package case 104 of the optical modulator 100.

For example, a DSP (Digital Signal Processor) 420 and a DRV (drive circuit, Driver) 422 are mounted in the secured electronic component mounting space on the circuit board 404. Further, an LD (Laser Diode) 424, a PD (Photo Diode) 426, and other electronic components (not shown) are mounted at other portions on the circuit board 404. The DSP 420 is an arithmetic processing device for executing processing of digital signals. The DRV 422 is an electric circuit for driving the optical modulator 100. The LD 424 inputs a laser light to the optical modulator 100 through the optical fiber 108. The PD 426 is installed for receiving a digital coherent optical signal.

That is, the optical transmission apparatus 400 includes the optical modulator 100 and the circuit board 404 that outputs an electric signal for causing the optical modulator 100 to perform a modulation operation. The electric components mounted on the circuit board 404 are examples, and electric components other than the above electric components may be mounted. Since there are various types of shapes such as the size or thickness of each component, they are not necessarily represented accurately in the drawings.

The output of the DRV 422 is transmitted through the conductor patterns 430, 432, 434, and 436 provided on the circuit board 404 and input to each of the lead pins 120, 122, 124, and 126. For example, relay connectors 440, 442, 444, and 446 are provided at the portions of the lead pins 120, 122, 124, and 126 from the circuit board 404 to the modulator package case 104 such that impedance mismatch does not occur. Further, the length of each of the lead pins 120, 122, 124, and 126 may be shorter than the height dimension of each of the protrusion portions 300, 302, 304, and 306, and in this case, the conductor patterns 430, 432, 434, and 436 on the circuit board 404 and the lead pins 120, 122, 124, and 126 can be connected through, for example, relay adapters having a predetermined characteristic impedance, or the like.

In the optical modulator 100 having the configuration described above, in particular, as shown in FIG. 1, the lead pins 120, 122, 124, and 126, which are a plurality of signal input terminals, are divided and disposed on the respective sides facing each other with the optical element substrate 102 interposed therebetween, in a case of being viewed in a plan view from the direction perpendicular to one surface of the outside of the modulator package case 104 (that is, the bottom surface of the modulator package case 104), and are respectively electrically connected to the plurality of RF electrodes 150, 152, 154, and 156 provided on the optical element substrate 102. Therefore, in the optical modulator 100, the electrical length from each of the RF electrodes 150, 152, 154, and 156 to each of the lead pins 120, 122, 124, and 126 which are signal input terminals can be shortened, compared to an optical modulator of the related art, in which a plurality of signal input terminals are disposed to be arranged in a line. In this way, it becomes possible to reduce the propagation loss of an electric signal, and it is possible to improve the high frequency characteristics such as the wider bandwidth of the modulator or a reduction in driving power.

Further, the lead pins 120, 122, 124, and 126 which are divided and disposed on the sides facing each other with the optical element substrate 102 interposed therebetween can be disposed at positions which are substantially symmetrical with, for example, a center line 350 in the width direction of the modulator package case 104 (a line extending in the length direction passing through the center in the width direction) interposed therebetween on the bottom surface of the modulator package case 104, as shown in FIG. 3. Therefore, even in a case where processing strain occurs in the modulator package case 104 when performing processing for providing the lead pins 120 and the like on the modulator package case 104, it is possible to prevent uneven distribution of the processing strain that induces asymmetrical deformation of the modulator package case 104 due to a temperature fluctuation. As a result, it is possible to prevent an increase in the loss of a lens coupling system inside the modulator package case 104 due to the occurrence of asymmetrical deformation in the modulator package case 104.

Further, since the lead pins 120, 122, 124, and 126 are divided and disposed on the sides facing each other with the optical element substrate 102 interposed therebetween, the distance between the respective ends of the lead pin rows disposed on the respective sides can be shortened compared to an optical modulator of the related art, in which all the four signal input terminals are disposed to be arranged in a line. Therefore, generation or an increase of stress on the lead pins 120, 122, 124, and 126 due to a difference in linear expansion coefficient between the modulator package case 104 and the circuit board 404 is suppressed. As a result, stable electrical connection between each of the lead pins 120, 122, 124, and 126 and each of the conductor patterns 430, 432, 434, and 436 on the circuit board 404 is secured, so that it is possible to suppress a temperature change or a secular change in high frequency characteristics.

Further, a space equal to or larger than the width of the optical element substrate 102 is secured between the lead pins 120 and 122 and the lead pins 124 and 126 divided and disposed on the sides facing each other with the optical element substrate 102 interposed therebetween. Therefore, for example, as shown in FIG. 4, the conductor patterns 430, 432, 434, and 436 that are the propagation paths of the radio frequency signal which is output from the DRV 422 can be formed using the space. As a result, it becomes possible to reduce the propagation loss of an electric signal by shortening the electrical length of the high frequency propagation path between the DRV 422 and each of the lead pins 120, 122, 124, and 126, and it is possible to obtain good optical modulation characteristics such as the wider bandwidth of the modulator or a reduction in driving power.

Further, in the optical modulator 100, the protrusion portions 300, 302, 304, and 306 are provided at a part of the modulator package case 104, so that an electronic component mounting space can be secured between the bottom surface of the modulator package case 104 and the circuit board 404.

In the related art, as a method of securing an electronic component mounting space between the bottom surface of a modulator package case and a circuit board, it has been known to provide a cutout in the modulator package case and secure the electronic component mounting space by the cutout (Japanese Laid-open Patent Publication No. 2017-134131). However, in a case where a cutout is provided in a package case, processing strain (for example, a processing deformation portion that reduces the flatness of the bottom surface of the package case) unevenly occurs due to the cutout. For this reason, if the package case is screw-fixed to a circuit board in an optical transmission apparatus, a fixing stress is generated in the package case, and thus a problem such as deterioration of optical characteristics such as a light passage loss of the optical modulator or fluctuation (deterioration) over time of the optical characteristics may occur. Further, for the same reason, a problem such as a change or deterioration of the high frequency characteristics of the optical modulator may occur.

In contrast, in the optical modulator 100, the cutout as in the related art is not provided, and the electronic component mounting space is secured by the protrusion portions 300, 302, 304, and 306 provided on a part of the bottom surface of the modulator package case 104. Therefore, in the optical modulator 100, most area of the bottom surface of the modulator package case 104 can be configured as a uniform flat surface. Here, since the protrusion portions 300, 302, 304, and 306 can be provided only at regions each having the area required for providing each of the screw holes 310, 312, 314, and 316, generation of processing strain or uneven distribution of the processing strain can be suppressed. From the viewpoint of reducing the processing strain of the modulator package case 104 and securing a mounting space for electric components such as the DSP 420 or the DRV 422, the total area of the protrusion portions 300, 302, 304, and 306 is preferably less than 50% and more preferably 25% or less with respect to the area of the bottom surface of the modulator package case 104.

As a result, in the optical modulator 100, it is possible to minimize the occurrence of the processing strain of the modulator package case 104, thereby suppressing the occurrence of minute deformation of the modulator package case 104 in a case where the optical modulator 100 is fixed onto the circuit board 404 of the optical transmission apparatus 400, and to suppress an initial change in the optical characteristics of the optical modulator 100 and a secular change in the optical characteristics due to a secular change in deformation stress.

In the present embodiment, the four lead pins 120, 122, 124, and 126 are divided and disposed by two pieces on each of the sides facing each other with the optical element substrate 102 interposed therebetween. However, the number of lead pins and a division aspect are not limited thereto. For example, four lead pins may be divided into three pieces and one piece, and the three pieces and the one piece may be respectively disposed on the sides facing each other with the optical element substrate 102 interposed therebetween. Further, for example, six lead pins may be divided by three pieces, divided into four pieces and two pieces, or divided into five pieces and one piece, according to the number of RF electrodes which are formed on the optical element substrate 102, to be respectively disposed on the sides facing each other with the optical element substrate 102 interposed therebetween. However, from the viewpoint of suppressing the processing strain in the modulator package case 104 and suppressing the generation of stress in the connection portion between the lead pin and the external circuit board, it is more desirable that the plurality of lead pins which are signal input terminals are disposed at positions which are substantially symmetrical with respect to the center line 350 in the width direction of the modulator package case 104 on the bottom surface of the modulator package case 104, as shown in FIG. 3, and/or it is more desirable that the plurality of lead pins are disposed at positions which are substantially symmetrical with respect to the center line in the length direction.

Next, modification examples of the shape of the bottom surface of the modulator package case and the disposition of the lead pins will be described. FIGS. 7, 8, 9, and 10 are diagrams showing the configurations of the bottom surface of a modulator package case that can be used in place of the modulator package case 104 having the layout shown in FIG. 3. The positions of the lead pins on the bottom surface of the modulator package case can be changed, for example, according to a change in the shape of each of the RF electrodes 150, 152, 154, and 156 on the optical element substrate 102, the shape of each of the relay boards 130 and 132, and the shape of each of the conductor patterns 140, 142, 144, and 146 which are formed on the relay boards 130 and 132. Further, in FIGS. 7, 8, 9, and 10, the same constituent elements as those shown in FIGS. 1, 2, and 3 are designated by the same reference numerals as those in FIGS. 1, 2, and 3, and the description of FIGS. 1, 2, and 3 described above is incorporated by reference.

First Modification Example

Figure 7:
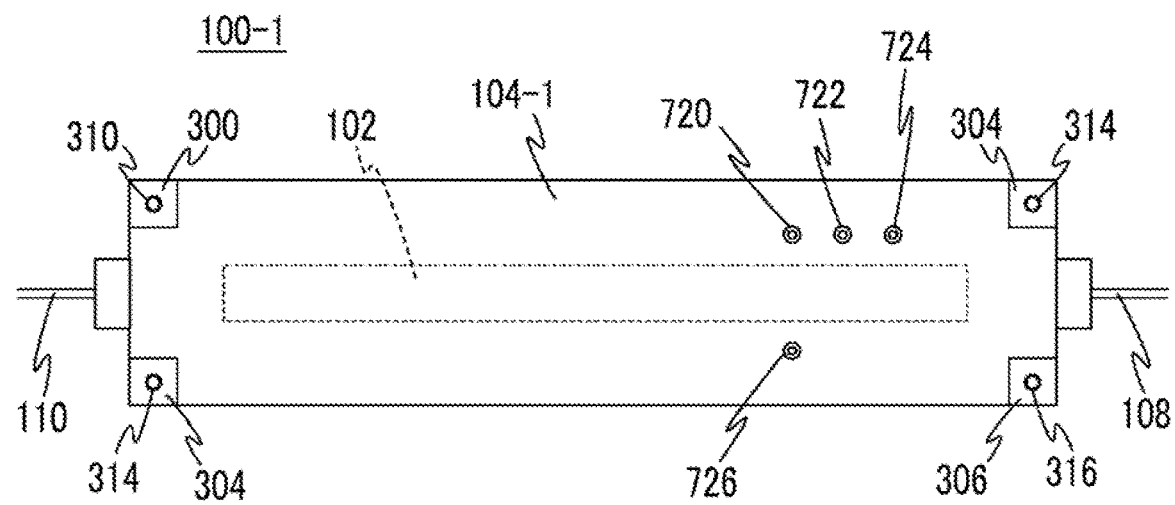
FIG. 7 is a bottom view showing the configuration of a first modification example of the optical modulator according to the embodiment of the present invention.

FIG. 7 is a diagram showing the configuration of the bottom surface of an optical modulator 100-1 according to a first modification example of the optical modulator 100, and is a diagram corresponding to the bottom view of the optical modulator 100 shown in FIG. 3. The optical modulator 100-1 has the same configuration as that of the optical modulator 100 except that four lead pins 720, 722, 724, and 726 are divided into three lead pins 720, 722, and 724 and one lead pin 726 to be respectively disposed on the sides facing each other with the optical element substrate 102 interposed therebetween, on the bottom surface of a modulator package case 104-1. The lead pins 720, 722, 724, and 726 are respectively connected to the RF electrodes 150, 152, 154, and 156 on the optical element substrate 102 through relay boards having the same configuration as those of the relay boards 130 and 132, for example.

In the optical modulator 100-1, similar to the optical modulator 100, the lead pins 720, 722, 724, and 726 which are a plurality of signal input terminals respectively electrically connected to the plurality of RF electrodes 150, 152, 154, and 156 provided on the optical element substrate 102 are divided and disposed on the sides facing each other with the optical element substrate 102 interposed therebetween. Therefore, in the optical modulator 100-1, compared to an optical modulator of the related art, in which a plurality of signal input terminals are disposed to be arranged in a line, it becomes possible to reduce the propagation loss of an electric signal by shortening the electrical length from each of the RF electrodes 150, 152, 154, and 156 to each of the lead pins 720, 722, 724, and 726, and it is possible to improve the high frequency characteristics such as the wider bandwidth of the modulator or a reduction in driving power.

Further, since the lead pins 720, 722, 724, and 726 are divided and disposed on the sides facing each other with the optical element substrate 102 interposed therebetween, the distance between the respective ends of the lead pin rows disposed on the respective sides can be made short, compared to an optical modulator of the related art, in which all the four signal input terminals are disposed to be arranged in a line. Therefore, generation or an increase of stress on the lead pins 720, 722, 724, and 726 due to the difference in linear expansion coefficient between the modulator package case 104 and the circuit board 404 is suppressed. As a result, stable electrical connection between each of the lead pins 720, 722, 724, and 726 and each of the conductor patterns on the circuit board can be secured to suppress a temperature change or a secular change in high frequency characteristics.

Further, a space equal to or larger than the width of the optical element substrate 102 is secured between the lead pins 720, 722, and 724 and the lead pin 726 divided and disposed on the sides facing each other with the optical element substrate 102 interposed therebetween. Therefore, a conductor pattern, which is a propagation path of a radio frequency signal which is output from a drive circuit such as the DRV 422, can be formed on the circuit board by using the space. As a result, it becomes possible to reduce the propagation loss of an electric signal by shortening the electrical length of the high frequency propagation path between the drive circuit and the lead pins 720, 722, 724, and 726, and it is possible to obtain good optical modulation characteristics such as the wider bandwidth of the modulator or a reduction in driving power.

Further, in the optical modulator 100-1, similar to the optical modulator 100, the protrusion portions 300, 302, 304, and 306 are provided on a part of the bottom surface of the modulator package case 104-1. That is, the modulator package case 104-1 is not provided with a cutout as in the related art, and therefore, similar to the optical modulator 100, the occurrence of processing strain in the modulator package case 104-1 or uneven distribution of the processing strain is suppressed to a minimum, and thus it is possible to suppress an initial change in the optical characteristics of the optical modulator 100-1 and a secular change in the optical characteristics due to a secular change in deformation stress.

Second Modification Example

Figure 8:
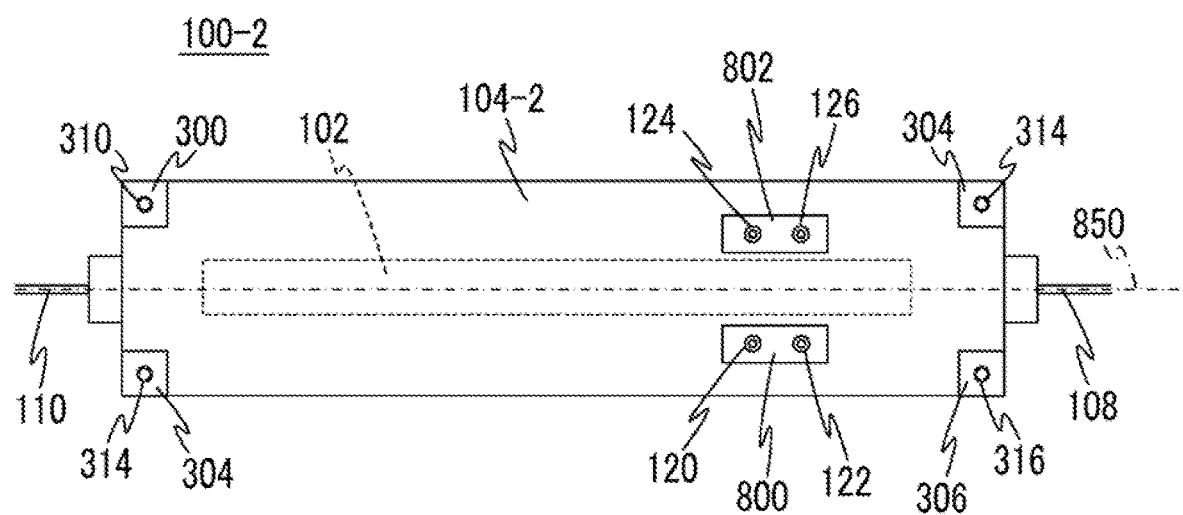
FIG. 8 is a bottom view showing the configuration of a second modification example of the optical modulator according to the embodiment of the present invention.

FIG. 8 is a diagram showing the configuration of the bottom surface of an optical modulator 100-2 according to a second modification example of the optical modulator 100, and is a diagram corresponding to the bottom view of the optical modulator 100 shown in FIG. 3. The optical modulator 100-2 has the same configuration as that of the optical modulator 100 except that two protrusion portions 800 and 802 are further formed on the bottom surface of a modulator package case 104-2, the lead pins 120 and 122 are disposed at a flat top portion of the protrusion portion 800 on one side, and the lead pins 124 and 126 are disposed at a flat top portion of the protrusion portion 802 on the other side.

That is, the lead pins 120 and 122 and the lead pins 124 and 126, which are signal input terminals divided and disposed on the sides facing each other with the optical element substrate 102 interposed therebetween, configure two terminal groups facing each other with the optical element substrate 102 interposed therebetween, and are respectively disposed at the top portions of the two protrusion portions 800 and 802 which are different for each terminal group. Here, the protrusion portions 800 and 802 are formed such that the heights measured from the bottom surface of the modulator package case 104-2 are the same as or lower than those of the protrusion portions 300, 302, 304, and 306 in which the screw holes 310, 312, 314, and 316 are provided. Further, the protrusion portions 800 and 802 are disposed, for example, at positions substantially symmetrical with respect to a center line 850 in the width direction of the modulator package case 104-2.

Since the optical modulator 100-2 has the same configuration as that of the optical modulator 100, the optical modulator 100-2 has advantages that the optical modulator 100 has, such as the improvement of the high frequency characteristics, the stability of the optical characteristics and the high frequency characteristics, and the improvement of a secular change. Further, in the optical modulator 100-2, since the lead pins 120 and the like are fixed to the circuit board by solder, for example, and the relay connectors 440 and the like are not interposed, it is possible to reduce a high frequency propagation loss or radio frequency signal reflection and to realize an optical transmission apparatus having better high frequency characteristics. Further, there is also a merit in terms of cost.

Further, in the optical modulator 100-2, the lead pins 120 and the like are disposed at the top portions of the protrusion portions 800 and 802, so that the clearance between the portion of the modulator package case 104-2, at which the lead pins 120 and the like are provided, and the circuit board can be greatly reduced, and therefore, the reproducibility of high frequency connection is improved, and it is hardly affected by the deformation of the modulator package case 104-2, the deformation of the circuit board, or the like. Therefore, it is possible to suppress a secular change in high frequency characteristics.

Further, similar to the optical modulator 100, the plurality of lead pins 120 and the like are divided and provided on the sides facing each other with the optical element substrate 102 interposed therebetween, and therefore, compared to the configuration of the related art, in which a plurality of lead pins are all disposed to be arranged in a line, it is possible to avoid the occurrence of stress in a high frequency connection portion (solder-fixing portion) due to the difference in linear expansion between the modulator package case 104-2 and the circuit board. Such a stress easily occurs particularly in the configuration in which the modulator package case and the circuit board closely face each other through the lead pin, as in the optical modulator 100-2, and therefore, the above-described stress suppressing effect due to the plurality of lead pins 120 and the like being divided and provided on the sides facing each other with the optical element substrate 102 interposed therebetween is extremely important.

The protrusion portions 800 and 802 provided with the lead pins 120 and the like does not need to necessarily be in contact with the circuit board, and a gap in a range of about 50 μm to 1 mm may be provided. Such a gap portion may be a simple space or may be filled with solder. Further, a thin relay member may be used in the gap portion.

Third Modification Example

Figure 9:
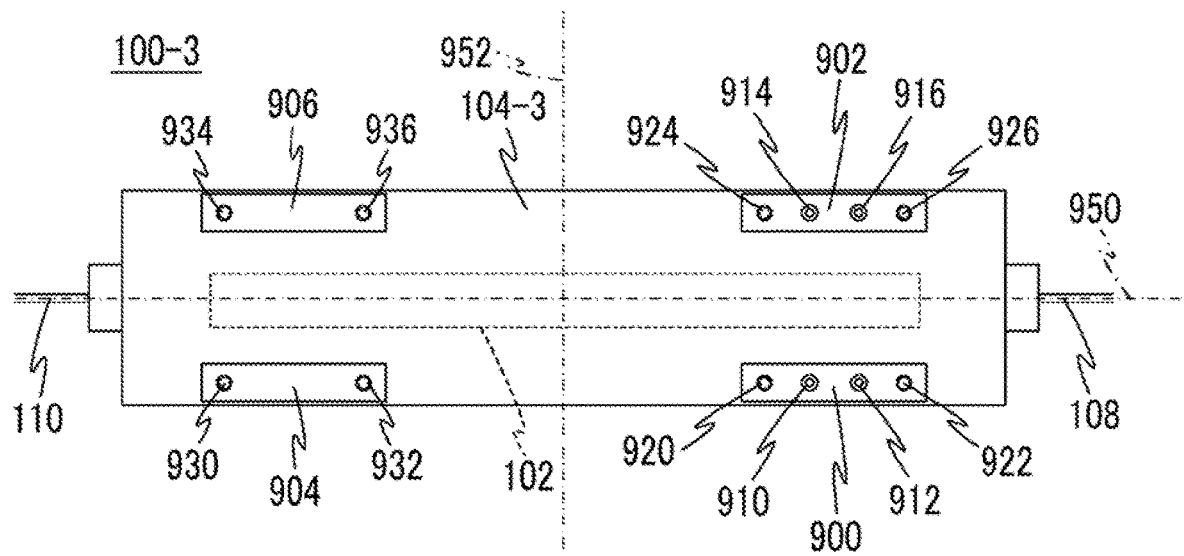
FIG. 9 is a bottom view showing the configuration of a third modification example of the optical modulator according to the embodiment of the present invention.

FIG. 9 is a diagram showing the configuration of the bottom surface of an optical modulator 100-3 according to a third modification example of the optical modulator 100, and is a diagram corresponding to the bottom view of the optical modulator 100 shown in FIG. 3. In the optical modulator 100-3, similar to the optical modulator 100, four lead pins 910, 912, 914, and 916 are divided and disposed on the sides facing each other with the optical element substrate 102 interposed therebetween. Here, the lead pins 910, 912, 914, and 916 are respectively electrically connected to the RF electrodes 150, 152, 154, and 156 on the optical element substrate 102 through relay boards similar to the relay boards 130 and the like, for example. Further, in the optical modulator 100-3, similar to the optical modulator 100, four protrusion portions 900, 902, 904, and 906 are provided, for example, at positions substantially symmetrical with respect to a center line 950 in the width direction and a center line 952 in the length direction of a modulator package case 104-3 on the bottom surface of the modulator package case 104-3, and screw holes 920 and 922, 924 and 926, 930 and 932, and 934 and 936 are provided in the four protrusion portions 900, 902, 904, and 906, respectively.

However, in the optical modulator 100-3, unlike the optical modulator 100, the lead pins 910 and 912 are provided on the protrusion portion 900 provided with the screw holes 920 and 922, and the lead pins 914 and 916 are provided on the provided protrusion portion 902 provided with the screw holes 924 and 926.

In the optical modulator 100-3, in addition to the same effects as the effects that the optical modulator 100 exhibits, it is possible to improve the strength and accuracy of the fixing of the lead pins 910 and the like, which propagate a radio frequency signal between the modulator package case 104-3 and the circuit board, to the circuit board, while reducing the number of unprocessed portions on the bottom surface of the package case, compared to the optical modulator 100-2 of the second modification example. Further, the distance between the modulator package case 104-3 and the circuit board can be shortened at the connection portions of the lead pins 910 and the like, and therefore, it is possible to prevent a decrease in the reliability of the fixing of the lead pins 910 and the like to the circuit board or the stability of the high frequency characteristics, due to the difference in linear expansion between the modulator package case 14-3 and the circuit board.

Further, in the optical modulator 100-3, the protrusion portions 900 and 902 provided with the lead pins 910 and the like, and the protrusion portions 904 and 906 for screw fixing having substantially the same shape as the protrusion portions 900 and 902 are disposed substantially symmetrically with respect to the center line 952 in the length direction of the modulator package case 104-3, and therefore, the fixing stability is further improved compared to the optical modulator 100-2 of the second modification example.

Fourth Modification Example

Figure 10:
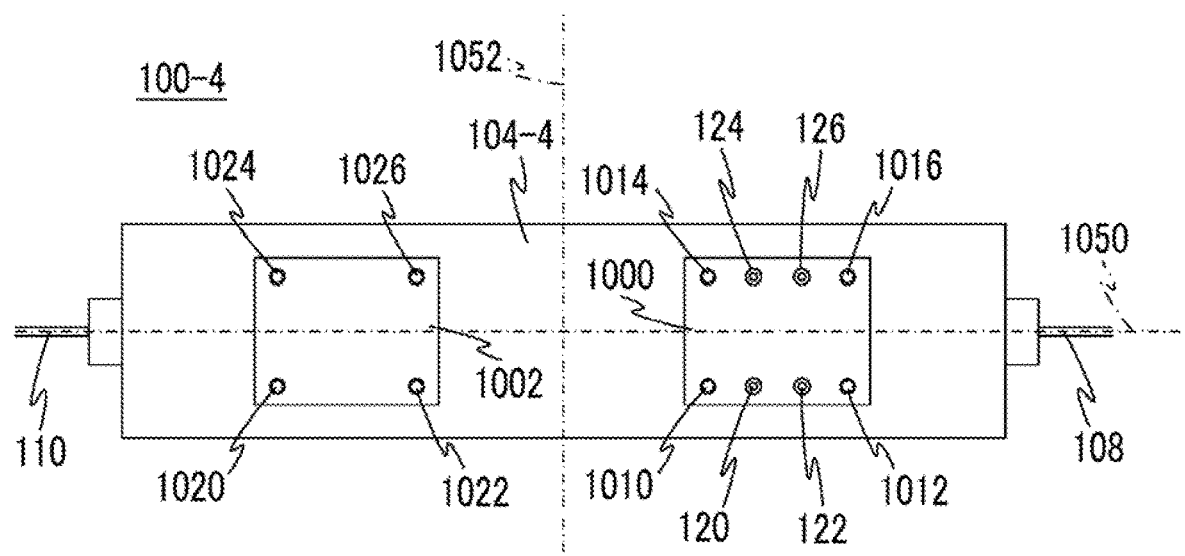
FIG. 10 is a bottom view showing the configuration of a fourth modification example of the optical modulator according to the embodiment of the present invention.

FIG. 10 is a diagram showing the configuration of the bottom surface of an optical modulator 100-4 according to a fourth modification example of the optical modulator 100, and is a diagram corresponding to the bottom view of the optical modulator 100 shown in FIG. 3. The optical modulator 100-4 has the same configuration as that of the optical modulator 100, but does not have the protrusion portions 300, 302, 304, and 306 at the four corners on the bottom surface of a modulator package case 104-4. Further, the bottom surface of the modulator package case 104-4 has one protrusion portion 1000 at the positions of the lead pins 120, 122, 124, and 126, and has another protrusion portion 1002 at a substantially symmetrical position with the central portion of the modulator package case 104-4 interposed therebetween. Both the protrusion portions 1000 and 1002 each have a shape substantially symmetrical with respect to a center line 1050 in the width direction of the modulator package case 104-4, for example, and the protrusion portions 1000 and 1002 are disposed at positions substantially symmetrical with respect to a center line 1052 in the length direction of the modulator package case 104-4, for example.

The top portions of the protrusion portions 1000 and 1002 have the same height measured from the bottom surface of the modulator package case 104-4. Further, screw holes 1010, 1012, 1014, and 1016 are provided at four corners of the flat top portion of the protrusion portion 1000, and the lead pins 120, 122, 124, and 126 are disposed at the flat top portion of the protrusion portion 1000. Further, screw holes 1020, 1022, 1024, and 1026 are provided at four corners of the flat top portion of the protrusion portion 1002.

The optical modulator 100-4 exhibits the same effects as the effects that the optical modulator 100 exhibits. In particular, in the optical modulator 100-4, compared to the optical modulator 100-3 of the third modification example, there are few processed portions, and the lead pins 120, 122, 124, and 126 are provided on the same bottom surface, that is, the top surface of the protrusion portion 1000. Therefore, in the optical modulator 100-4, compared to the optical modulator 100-3, the stability and uniformity of the connection state between the lead pins 120, 122, 124, and 126 and the circuit board are improved. As a result, it is possible to realize an optical transmission apparatus with less variation in high frequency characteristics between the high frequency transmission channels which are configured by the lead pins 120, 122, 124, and 126.

Fifth Modification Example

Figure 11:
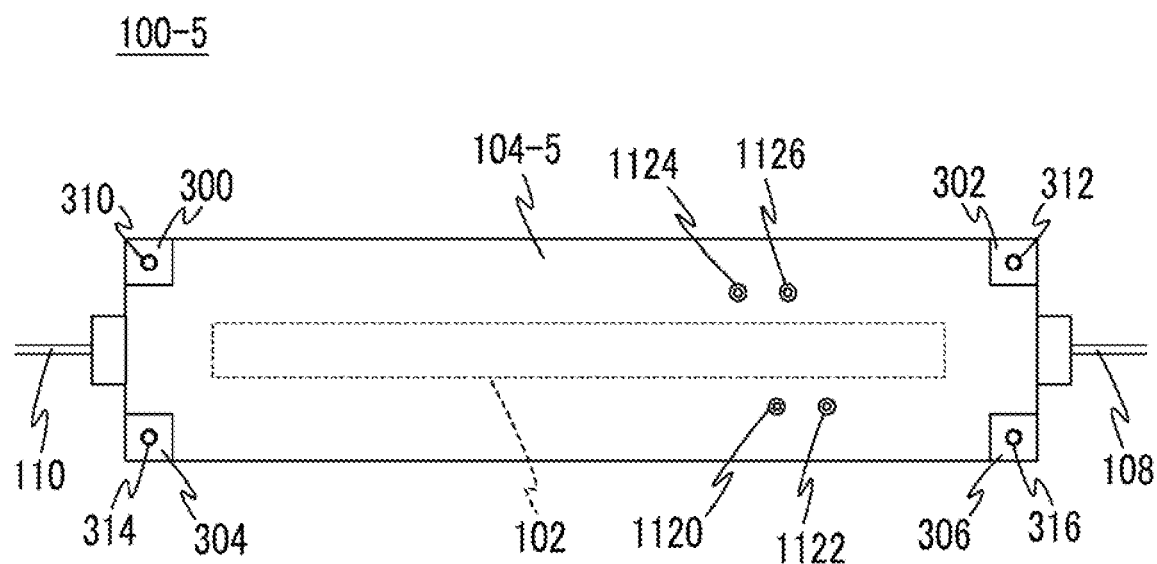
FIG. 11 is a bottom view showing the configuration of a fifth modification example of the optical modulator according to the embodiment of the present invention.

FIG. 11 is a diagram showing the configuration of the bottom surface of an optical modulator 100-5 according to a fifth modification example of the optical modulator 100, and is a diagram corresponding to the bottom view of the optical modulator 100 shown in FIG. 3. The optical modulator 100-5 has the same configuration as that of the optical modulator 100. However, lead pins 1120 and 1122 and lead pin 1124 and 1126 divided and disposed on the sides facing each other with the position of the optical element substrate 102 inside a modulator package case 104-5 interposed therebetween are disposed at positions shifted from each other along the length direction of the optical element substrate 102 or the modulator package case 104-5, on the bottom surface of the modulator package case 104-5. Here, the lead pins 1120, 1122, 1124, and 1126 are respectively connected to the RF electrodes 150, 152, 154, and 156 of the optical element substrate 102, similar to the lead pins 120, 122, 124, and 126.

Even in the disposition as described above, the lead pins 1120, 1122, 1124, and 1126 are divided and disposed on the sides facing each other with the optical element substrate 102 interposed therebetween, and therefore, in the optical modulator 100-5, the same effects as those in the optical modulator 100 can be exhibited. That is, in the optical modulator 100-5, compared to an optical modulator of the related art, in which a plurality of signal input terminals are disposed to be arranged in a line, it becomes possible to reduce the propagation loss of an electric signal by shortening the electrical length from each of the RF electrodes 150, 152, 154, and 156 to each of the lead pins 1120, 1122, 1124, and 1126, and it is possible to improve the high frequency characteristics such as the wider bandwidth of the modulator or a reduction in driving power.

Further, the distance between the respective ends of the lead pin rows disposed on the respective sides with the optical element substrate 102 interposed therebetween is made short compared to an optical modulator of the related art, in which all the four signal input terminals are disposed to be arranged in a line, and thus generation or an increase of stress on the lead pins 1120, 1122, 1124, and 1126 is suppressed. As a result, the stable electrical connection between each of the lead pins 1120, 1122, 1124, and 1126 and each of the conductor patterns on the circuit board can be secured to suppress a temperature change or a secular change in high frequency characteristics.

Further, since a space equal to or larger than the width of the optical element substrate 102 is secured between the lead pins 1120 and 1122 and the lead pins 1124 and 1126 divided and disposed on the sides facing each other with the optical element substrate 102 interposed therebetween, a conductor pattern such as a propagation path of a radio frequency signal can be formed on the circuit board by using the space. As a result, it becomes possible to reduce the propagation loss of an electric signal by shortening the electrical length of the high frequency propagation path between the drive circuit and each of the lead pins 1120, 1122, 1124, and 1126, and it is possible to obtain good optical modulation characteristics such as the wider bandwidth of the modulator or a reduction in driving power.

Further, also in the optical modulator 100-5, similar to the optical modulator 100, since the protrusion portions 300, 302, 304, and 306 are provided on a part of the bottom surface of the modulator package case 104-5 and a cutout as in the related art is not provided, the occurrence of processing strain in the modulator package case 104-5 or uneven distribution of the processing strain is suppressed to a minimum, and an initial change in the optical characteristics of the optical modulator 100-5 and a secular change in the optical characteristics due to a secular change in deformation stress can be suppressed.

In the embodiments described above, the modulator package cases 104, 104-1, 104-2, 104-3, 104-4, and 104-5 each have the plurality of protrusion portions 300 and the like on the bottom surface thereof. However, there is no limitation thereto. As long as an electronic component mounting space can be secured between the bottom surface of the modulator package case 104 or the like and the external circuit board, it is favorable if at least one protrusion portion is provided.

As described above, the optical modulator 100 according to the embodiment described above includes the optical element substrate 102 which includes an optical waveguide and the plurality of RF electrodes 150 and the like which control light waves propagating through the optical waveguide, and the modulator package case 104 which houses the optical element substrate 102. Then, the modulator package case 104 includes the lead pins 120 and the like, which are a plurality of signal input terminals respectively electrically connected to the plurality of RF electrodes 150 and the like, and the plurality of lead pins 120 and the like are divided and disposed on the sides facing each other with the optical element substrate 102 interposed therebetween.

In this way, in the optical modulator 100, it is possible to improve the high frequency characteristics and improve the stability thereof.

In each of the embodiments described above, the optical modulator which includes an optical element substrate having four RF electrodes using LN as a substrate is shown. However, the present invention is not limited to this and can also be likewise applied to an optical modulator having a number of RF electrodes other than four and/or an optical modulator using a material other than LN as a substrate.

REFERENCE SIGNS LIST

100, 100-1, 100-2, 100-3, 100-4, 100-5: optical modulator
102: optical element substrate
104, 104-1, 104-2, 104-3, 104-4, 104-5: modulator package case
108, 110: optical fiber
114*a*: case
114*b*: cover
120, 122, 124, 126, 720, 722, 724, 726, 910, 912, 914, 916, 1120, 1122, 1124, 1126: lead pin
130, 132: relay board
140, 142, 144, 146, 430, 432, 434, 436: conductor pattern
150, 152, 154, 156: RF electrode (radio frequency electrode)
160: terminator
300, 302, 304, 306, 800, 802, 900, 902, 904, 906, 1000, 1002: protrusion portion
310, 312, 314, 316, 920, 922, 924, 926, 930, 932, 934, 936, 1010, 1012, 1014, 1016, 1020, 1022, 1024, 1026: screw holes
350, 850, 950, 952, 1050, 1052: center line
400: optical transmission apparatus
402: device package case
404: circuit board
410, 412, 414, 416: screw
420: DSP
422: drive circuit (DRV)
424: LD
426: PD
440, 442, 444, 446: relay connector

The invention claimed is:

1. An optical modulator comprising:
an optical element substrate which includes an optical waveguide and a plurality of electrodes that control light waves propagating through the optical waveguide; and
a package case that fixes and houses the optical element substrate,
wherein
a plurality of signal input terminals respectively electrically connected to the plurality of electrodes are provided on a bottom of an outside of the package case,
in a plan view along a direction perpendicular to a bottom surface of the outside of the package case, the plurality of signal input terminals are divided and disposed on respective sides facing each other with the optical element substrate interposed therebetween,
the package case has, on the bottom surface, at least a pair of protrusion portions protruding from the bottom surface and having a same height from the bottom surface,
at least one of the protrusion portions has a flat bottom portion provided with a screw hole for fixing the package case with a screw to an external circuit board including an electric circuit outputting an electric signal for causing the optical modulator to perform a modulation operation,
the plurality of signal input terminals are disposed flush with the flat bottom portion of at least one of the protrusion portions so that, in a state in which the package case is fastened to the circuit board by the screw, the plurality of signal input terminals and conductor patterns provided on the circuit board closely face each other and are electrically connected with each other, and
the signal input terminals are disposed on a same protrusion portion that is provided with the screw hole.

2. The optical modulator according to claim 1, wherein the plurality of protrusion portions are disposed at positions substantially symmetrical with respect to a center line in a length direction and/or a width direction of the package case on the bottom surface of the package case.

3. The optical modulator according to claim 1, wherein the plurality of signal input terminals are disposed at positions substantially symmetrical with respect to a center line in a length direction and/or a width direction of the package case on the bottom surface of the package case.

4. An optical transmission apparatus comprising:
the optical modulator according to claim 1; and
the circuit board.

5. The optical modulator according to claim 1, wherein the signal input terminals constitute two terminal groups facing each other with the optical element substrate interposed therebetween.

6. The optical modulator according to claim 5, wherein the plurality of protrusion portions are disposed at positions substantially symmetrical with respect to a center line in a length direction and/or a width direction of the package case on the bottom surface of the package case.

7. The optical modulator according to claim 5, wherein the plurality of signal input terminals are disposed at positions substantially symmetrical with respect to a center line in a length direction and/or a width direction of the package case on the bottom surface of the package case.

8. An optical transmission apparatus comprising:
the optical modulator according to claim 5; and
the circuit board.

* * * * *